United States Patent [19]

Gallagher

[11] 4,431,024
[45] Feb. 14, 1984

[54] FLOAT-CONTROLLED VALVE FOR TOILET FLUSH TANKS

[75] Inventor: Patrick Gallagher, Albuquerque, N. Mex.

[73] Assignee: Trenton Pipe Nipple Company, Trenton, N.J.

[21] Appl. No.: 313,049

[22] Filed: Oct. 19, 1981

[51] Int. Cl.³ .................. F16K 31/34; F16K 33/00
[52] U.S. Cl. ................................ 137/413; 137/426; 137/430; 137/437
[58] Field of Search ............... 137/403, 408, 414, 426, 137/430, 432, 437, 413

[56] References Cited

U.S. PATENT DOCUMENTS

| | | | |
|---|---|---|---|
| 522,644 | 7/1894 | Berry | 137/437 |
| 2,827,073 | 3/1958 | Owens | 137/437 |
| 3,115,153 | 12/1963 | Delamater | 137/413 |
| 3,144,875 | 8/1964 | Goldtrap | 137/414 |
| 3,285,277 | 11/1966 | Goldtrap | 137/414 |
| 3,554,219 | 1/1971 | Hudson | 137/432 |
| 3,693,649 | 9/1972 | Gordon et al. | 137/432 |
| 3,729,017 | 4/1973 | Brandelli | 137/432 |
| 4,186,765 | 2/1980 | Anderson | 137/432 |

Primary Examiner—George L. Walton
Attorney, Agent, or Firm—Frederick A. Zoda; John J. Kane

[57] ABSTRACT

A valve assembly is adapted to control the water level within a toilet flush tank, by gravitational bodily movement of a hush tube and a valve housing integral therewith, responsive to emptying of the tank. A float coaxial with and secured fixedly to the hush tube is weighted in a manner to cause the gravitational motion of the hush tube and valve housing, when the float loses buoyancy as a consequence of the emptying of the flush tank contents. The gravitational movement of the float, hush tube, and valve housing in respect to an upstanding fill tube upon which these elements of the assembly are mounted for up and down sliding motion, causes actuation of a pilot reed valve. The pilot valve acts to break a valve seal between the fill tube and the valve housing, to an extent such that a very small force used in the opening of the pilot valve is sufficient to allow the normal line pressure to assert itself for full unseating of the valve and a consequent normal refilling of the flush tank.

17 Claims, 9 Drawing Figures

FLOAT-CONTROLLED VALVE FOR TOILET FLUSH TANKS

BACKGROUND OF THE INVENTION

1. Field of the Invention

The invention relates generally to liquid level control valves. In a more particular sense, the invention is especially adapted for use as a valve that controls the inflow of water within a toilet flush tank, to replace the quantity of water flushed from the tank during normal use of the toilet facility.

The invention has particular reference to those toilet flush tank control valves wherein a float is coaxial with an upstanding fill tube, being mounted for vertical motion thereon responsive to the rise and fall of the liquid level within the flush tank.

2. Description of the Prior Art

Heretofore, float-controlled inflow valves for toilet flush tanks, having floats concentric with the upstanding, fixedly mounted fill tube, are well known per se. These, however, have had certain deficiencies in respect to smooth and efficient operation.

Problems noted in connection with devices of this type include, for example, the tendency on the part of the valve to be clogged or otherwise affected adversely by the presence of particles within the liquid. These particles tend to lodge in the valve seat, or otherwise restrict the flow of liquid through the valve, so that there is a pronounced tendency toward clogging of the valve to such an extent as would tend to prevent it from fully closing, with an attendant waste of water.

It has further been noted in prior art devices of the same general type that a maximum usage of water pressures present during the refilling operation has not been incorporated in the construction. It is desirable to take full advantage of such pressures, to render the valve operation more efficient, and to assure to the maximum extent that there will be long, trouble-free operation during the normal life of the valve assembly.

SUMMARY OF THE INVENTION

Summarized briefly, the present invention comprises an upstanding fill tube, which will be connected to a source of water under pressure and which will be fixedly mounted upon the bottom wall of a toilet flush tank, in the usual manner already conventional in the installation of ballcocks and other toilet tank liquid level control valve structures. The invention thus requires no change in the conventional flush tank constructions already in use, and is well adapted as a replacement of a worn or malfunctioning valve assembly already installed.

Receiving the fill tube, and adapted for up and down motion upon the fill tube, is a combined valve housing and float assembly including a float of annular form concentric with the fill tube, a hush tube to which the float is secured and which is also disposed in concentric relation to the fill tube, and a valve housing mounted upon the upper end of the hush tube. The fill tube, at its upper extremity, has an outwardly directed, downwardly facing valve seat. Within the valve housing, a valve chamber assembly includes a valve chamber mounted for limited up and down movement in respect to both the vertically movable valve housing and the stationary fill tube. The valve chamber is provided with a pilot valve. Upon dropping of the water level within the tank when the toilet is flushed, the valve housing and float ultimately drop in a manner to engage and unseat the pilot valve, causing the pressure in the upper part of the valve chamber to fall relative to the pressure in the lower part of the chamber. The line pressure is in this way permitted to assert itself, to move the valve assembly to a full open position for refilling of the flush tank.

When the flush tank is fully refilled, the float moves upwardly to an extent sufficient to engage the underside of the valve chamber assembly and bias it upwardly. The pilot reed valve is thus permitted to revert to its sealing position. An increase in pressure in the upper part of the chamber is thereby effected, and results in an upward displacement of the valve assembly and a consequent rapid closure of the main valve.

DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
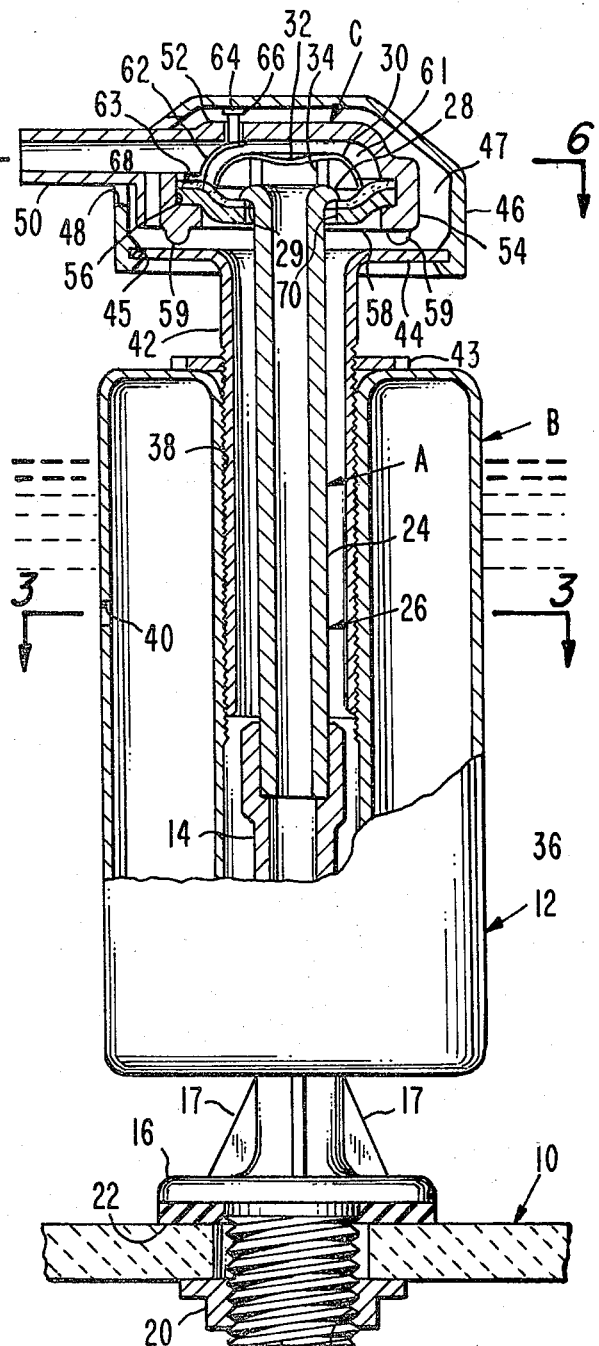
FIG. 1 is a view of a float controlled valve for toilet flush tanks made in accordance with the present invention as it appears between flushes with the flush tank filled, the pilot valve and the main valve being in closed position, portions being shown in elevation and other portions being shown in vertical section, the flush tank being illustrated fragmentarily and in section.

The valve structure comprising the present invention is illustrated in FIG. 1 as being mounted upon the bottom wall of a toilet flush tank generally designated 10. The invention has been generally designated 12, and essentially comprises three main component assemblies; a fixedly mounted, stationary, upstanding fill tube structure A, a valve housing and float structure generally designated B mounted for limited up and down movement upon and in respect to the fill tube structure A, and a valve chamber assembly generally designated C and mounted within the valve housing for limited up and down movement in respect to both the fill tube structure A and the housing-float assembly B. Each will be described in turn.

FILL TUBE STRUCTURE A

As will be seen from FIG. 1, the fill tube structure A includes an upstanding, tubular, lower portion 14 cast or otherwise made integral at its lower end with a flat, outwardly directed, circular base flange 16, the connection of which to the portion 14 is strengthened by angularly spaced gussets 17. Integral with flange 16 and extending downwardly therefrom is an externally threaded nipple 18 extendable downwardly through a smooth-walled mounting opening 19 formed in the bottom wall of the flush tank, to receive a mounting nut 20 which, when threaded upwardly upon nipple 18, compresses an annular gasket 22 between the base flange 16 and the bottom wall of the flush tank.

At its upper end, the tubular lower portion 14 of the fill tube structure has internal threads engaging mating threads provided upon the lower extremity of a tubular upper portion 24 of the fill tube structure. Portion 24 extends upwardly within the flush tank and cooperates with the tubular lower portion in defining an inflow or fill tube generally designated 26.

At its upper or distal extremity, the tubular upper portion 24 is formed with an outwardly directed flange 28 defining a downwardly facing, flat shoulder or valve seat 29. Extending upwardly from and fixedly secured to the flange 28 is a flow deflector 30 fashioned as a generally circular, relatively thin plate element of inverted cup shape the outer diameter of which is substantially greater than the outer diameter of the flange 28. The plate element from which the flow deflector is formed is shallowly depressed or dished at its center, as shown at 32, for the purpose of shaping the flow deflector to smoothly turn the flow of the incoming liquid during the tank refilling operation, so that the liquid will flow upwardly out of the fill tube, be deflected with minimum disturbance radially outwardly of the flow deflector, and given a reverse flow at the area of the downwardly turned inverted cup shaped marginal portion of the deflector.

The flow deflector (see FIG. 8) is formed, at its periphery, with a comnb-like edge formation 33, to decrease the size of entrained particles near the pilot exit of the valve chamber assembly. The comb-like edge will constantly be cleaned by the flow of water past the flow deflector, during the normal operation of the invention.

Figure 4:
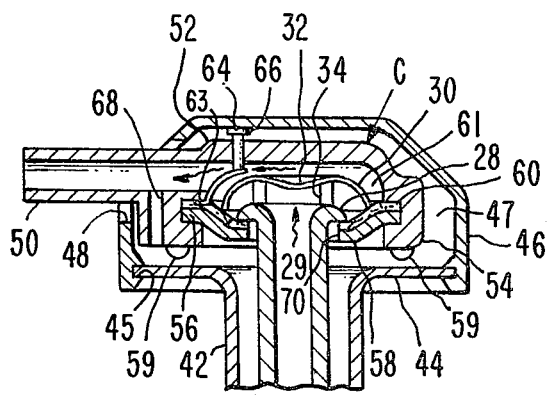
FIG. 4 is a fragmentary vertical section of the upper portion of the valve structure as it appears when the tank has been flushed and the seal between the pilot valve and exit tube has been broken to initiate a refill of the tank.
Figure 8:
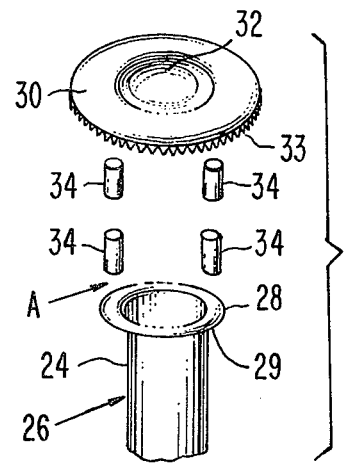
FIG. 8 is an exploded perspective view of the flow deflector and the upper portion of the fill tube, the lower portion of the fill tube being broken away.
Figure 9:
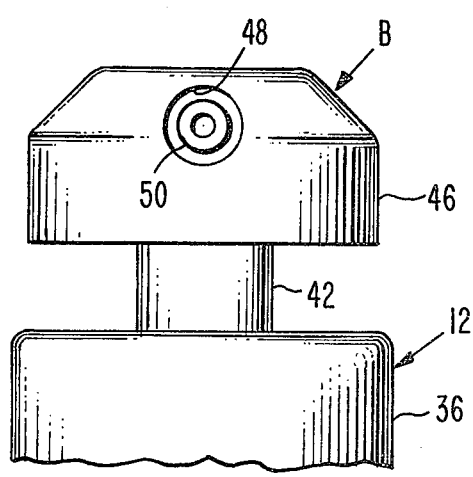
FIG. 9 is a fragmentary elevational view of the upper portion of the device as seen from the left of FIG. 1.

The flow deflector, as seen from FIGS. 1, 4, and 8, is spaced upwardly from the flange 28 through the provision of angularly spaced spacer pins 34, which are fixedly secured both to the flow deflector and to the upper end of the tubular portion 24. The flow deflector is thus mounted in the inverted, cup-shaped arrangement previously described, in spaced relation to the upper end of the tubular portion 24, and the edge of the flow deflector will be concentric with but disposed laterally outwardly from the valve seat 29.

VALVE HOUSING AND FLOAT ASSEMBLY B

This entire assembly, unlike the fill tube structure A, is mounted upon the fill tube structure for limited up and down motion, during each refilling cycle. It includes, at its lower end, a vertically elongated, annular float 36 which has a through, axial bore 38 within which a vertically disposed hush tube 42 is secured to the float for adjustment axially thereof (for example, by being threadedly connected thereto). The tube 42 surrounds the tubular upper portion 24 of fill tube structure A in concentric, spaced relation therewith. Upon axial adjustment of the float relative to the hush tube, a spanner nut 43 engages the upper end of the float to preserve the adjustment and fixedly secure the float to the hush tube for joint movement. Other means for effecting and preserving the axial adjustment may of course be used. That illustrated is merely an example of one that can be employed to advantage.

The float 36, intermediate its ends, has a flow port 40, through which water can enter the float during the initial installation of the device. Water entering port 40 will fill the float up to the level of the port. In these circumstances, air between the level of the port 40 and the upper end of the float will be trapped within the float, and will impart buoyancy to the float whenever the liquid level within the flush tank rises above the port. The water in the lower portion of the float acts as a weight, tending to cause the float to normally move downwardly, carrying with it the hush tube 42, when the flush tank empties.

The hush tube extends upwardly beyond the upper end of the float 36, and is formed, at its upper extremity, with an outwardly directed flange 44. The periphery of flange 44 is fixedly engaged in an internal groove 45 formed in the lower end of a valve housing 46 shaped to define a domed, circular cavity 47. Formed in the sidewall of the cavity is a large exit tube clearance opening 48.

The entire valve housing and float assembly B is thus adapted to move first downwardly, and then upwardly, in respect to the stationary fill tube structure during the drainage of the flush tank contents and the subsequent refilling of the tank.

VALVE CHAMBER ASSEMBLY C

The valve chamber assembly C is also movably mounted, and in this case is movable both in respect to the assembly B and the fill tube structure A. The valve chamber assembly is disposed mainly within the housing 46 in spaced relation to the sidewall of the housing. It includes an exit tube 50 extending laterally outwardly through the clearance opening 48. Exit tube 50, at its inner end, is integral with a domed valve chamber element 52 disposed within the valve housing 46 in concentric, inwardly spaced relation to the sidewall of the valve housing 46.

The valve chamber element 52 is formed with a depending flange 54 having an inwardly opening, circular groove 56 in which is secured an annular, downwardly offset valve gasket retainer ring 58 to the upper surface of which is secured an elastomeric gasket 60 adapted to seat tightly against valve seat 29. The elastomeric gasket 60 also provides a seal between the valve chamber element 52 and the retainer ring 58.

Integral with the flange 54 is an annular series of angularly spaced, depending spacer lugs 59. There may be, in a typical embodiment, four of these angularly spaced 90° apart. They serve to maintain an air passage between the flanges 44 and 52, which is desirable to insure against preventing the "siphoning" effect often seen in flush tank valve mechanisms.

The flow deflector, when gasket 60 engages seat 29, divides a valve chamber 61 defined in valve chamber element 52. The division provides an upper chamber portion above and a lower chamber portion below the deflector.

Figure 2:
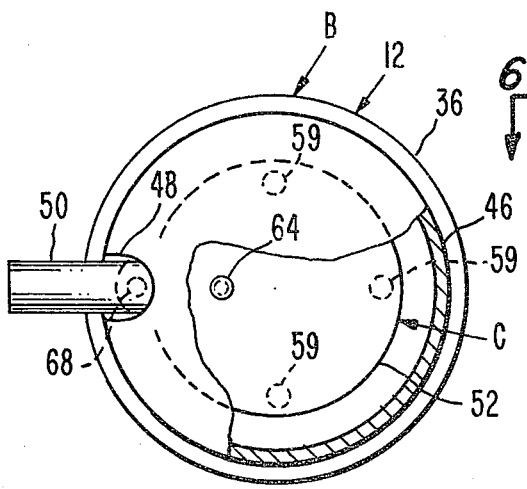
FIG. 2 is a top plan view, in which a portion of the valve housing has been broken away to partially expose the valve chamber assembly supported therein.
Figure 3:
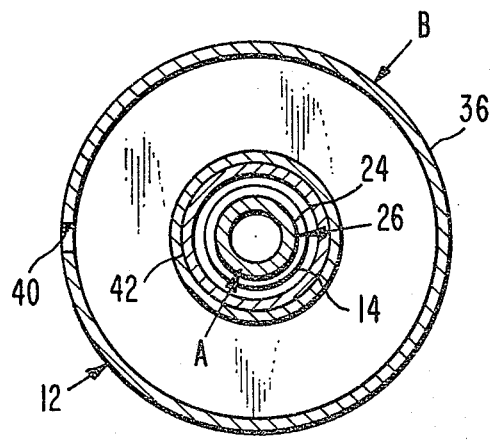
FIG. 3 is a transverse sectional view through the float, hush tube, and fill tube, substantially on line 3—3 of FIG. 1.
Figure 7:
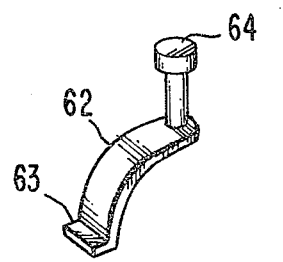
FIG. 7 is a perspective view of the pilot valve and actuator pin, per se.

Also comprising part of the valve assembly C is a pilot reed valve means. This includes a pilot reed 62 (FIG. 7) which is of a stiff but resiliently flexible material. Reed 62 normally lies against and sealably closes bowl-fill exit opening 63 communicating exit tube 50 with inner valve chamber 61. Opening 63 is open to the atmosphere. The pilot reed 62 is thus, in effect, a smaller valve within a larger one.

An actuator pin 64 engages the upper end of the reed 62. The pin 64 may be secured to the reed 62 but this is not essential; it is enough that it engages the upper end thereof.

At its lower end the reed is formed with a tab or lip 65, which engages in groove 56 between the gasket 60 and the top wall of the groove to anchor the reed 62 at its lower end.

The actuator pin, as seen in FIG. 1, normally extends upwardly into light contact with the underside of the top wall of the valve chamber housing 46.

The actuator pin extends through an opening 66 formed in the top wall of the valve chamber element 52, and is loosely engaged in the opening so that the actuator pin is free to move upwardly and downwardly therein. The downward movement of the actuator pin is caused by a downward movement of the valve housing and float assembly B in respect to the valve chamber assembly C, and in particular by a downward movement of the horizontal top wall of the valve chamber housing 46 in respect to the actuator pin carried by the valve assembly.

A leakage port 68 communicates the exit tube 50 with the area of the chamber 47 below the valve assembly.

OPERATION

In use, the present invention is readily installed in a flush tank as original equipment, or as a replacement part. In either event, the entire structure, preassembled during manufacture, is installed in the flush tank by threading of nut 20 upwardly on the nipple 18, to compress sealing gasket 22 and mount the entire structure in an upstanding position within the flush tank. The fill tube structure A, as will be obvious, is fixedly, stationarily mounted within the flush tank, but the assemblies B and C are movable in respect to the fill tube structure and also in respect to each other.

During installation, with the device fully mounted and the flush tank empty one would first press down lightly on top of the ballcock assembly to facilitate complete filling. This downward pressure is transmitted through the top wall of the housing 46 to the top wall of the valve chamber element 52, to open the main valve by unseating the gasket 60. The purpose of exerting manual pressure during the initial installation is to counter any tendency of strong line and flow pressures to render the float excessively buoyant in the filling—a situation which would cause premature closing of the valve during the initial filling.

In any normal filling, the water level, as it rises within the flush tank during the initial filling, will move up to the level of the port 40. Water will now enter the port, filling the float up to the plane in which the port 40 is disposed. If desired, there can be a series of ports similar to the port 40, all located in the same horizontal plane and spaced circumferentially of the float to accelerate the flow of water into the bottom of the float.

The water flowing into the float through the ports 40 constitutes a weight which will thereafter be provided at all times within the float.

The filling of the tank on initial installation thereafter proceeds in the same manner as during a regular flush, as fully described hereinafter.

FIG. 1 illustrates the device as it appears between flushes, with the tank filled.

Assuming now that the tank is to be flushed, water will drain out of the tank, below the level of the float. The float, however, is weighted due to the trapping of water below the level of the intake port. As the float drops, the housing 46 drops with it to the position shown in FIG. 4, and as a result, pressure will be exerted against the pilot valve actuator pin by the top wall of the valve housing.

The upper end of the pilot reed 64 is thus deflected to the FIG. 4 position, breaking the seal between the reed and the opening 63. This causes a slight leakage or trickle out of the upper portion of chamber 61 through opening 63, above the deflector or divider 32. As a consequence, there is a lowering of static pressure within the upper portion of chamber 61 relative to the lower chamber portion, in which pressure is substantially maintained because of the presence of the divider. It may be here noted that when the deflector-divider 32 is seated (as it would be at this stage) the teeth at its periphery extend inwardly along gasket 60 to an extent that renders the upper and lower chamber portions non-communicating. The drop in pressure in the upper portion of chamber 61, above deflector-divider 32, relative to that in the lower chamber portion below the deflector-divider, causes a decrease in the force holding the gasket 60 against the seat 29. This is because the sealing pressure that holds the gasket against the valve seat is the pressure in the upper chamber portion exerting an upward force against the underside of the top wall of the chamber 61. This upwardly exerted force normally overcomes any tendency of the line pressure to force the valve gasket retainer ring 58 away from the seat 29.

When the decrease in the force exerted upwardly against the top wall of chamber 61 becomes significant relative to the line pressure maintained in the lower chamber portion, the maintained line pressure will force the gasket 60 and its retainer ring 58 away from the seat. The parts will now appear as in FIG. 5, and the re-filling of the flush tank will now proceed rapidly.

During this time, reed 62 continues to be deflected by pin 64 to allow maximum flow out of the bowl-fill exit 50. Because there is a continuous flow through the upper chamber portion past the reed, the pressure in that vicinity cannot exceed the force of the flow holding the valve open.

The float now becomes buoyant. The weight of the float therefore is no longer transmitted to pin 64, and the reed will rise again to its sealing position against the bowl-fill exit. Slowing down the flow through the bowl-fill exit will cause the pressure to rise in the upper portion of chamber 61. The increase in pressure there, accompanied by the hush tube housing exerting an upward force against the underside of valve element 52, results in an upward displacement of element 52 and subsequent rapid sealing of both the main seal 60 at the seat 29 and the pilot reed 64 at the bowl-fill exit opening 63.

There is a snap opening feature in that the main valve 58, 60 will open instantly as soon as the drop in pressure in the upper portion of chamber 61 falls below a predetermined value relative to the maintained pressure in the lower portion of the chamber. Conversely, when the valve chamber 61 is displaced upwardly and the pilot valve is fully seated, pressure will increase in the upper chamber portion to a significant value effective to cause a snap closing action during re-fill.

Figure 5:
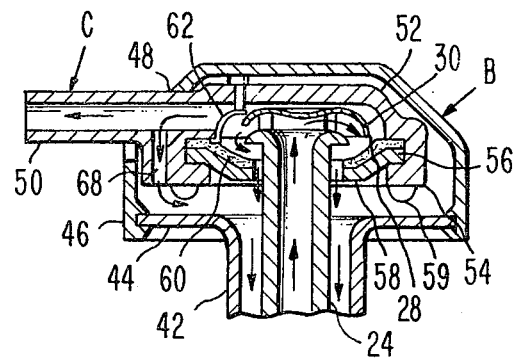
FIG. 5 is a view like FIG. 4 illustrating the next step of the refill operation, in which the main valve has been opened.
Figure 6:
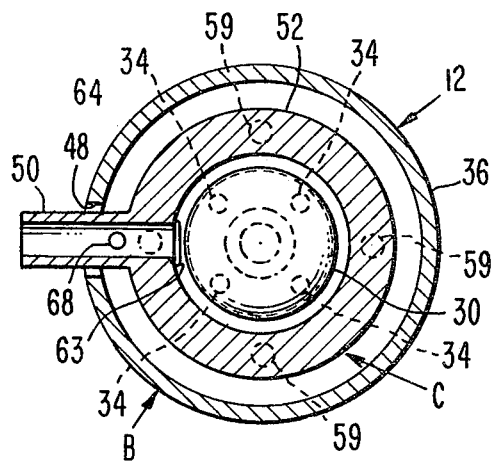
FIG. 6 is a horizontal sectional view through the valve housing and valve assembly, substantially on line 6—6 of FIG. 1.

During normal full open operation of the valve, the higher flow pressure of the entering stream of water will cause that stream to continue traveling horizontally as long as reed 64 remains deflected to its FIG. 4 or FIG. 5 position, with some water exiting via the fill tube 50, and other water passing through the drainage port 68 and downwardly between the hush tube and the fill tube structure.

This feature is desirable, in that it eliminates a condition known to exist in other pilot valve arrangements. It has been known that pilot valves heretofore devised seem to operate of their own volition in the presence of a leaking flush valve. This occurs because the float must fall far enough to cause the valve to open fully. This produces noisy operation and strange and undesirable sounds. By providing a leakage path as disclosed, however, the tank can be filled continuously without the occurrence of these strange sounds. This is a feature of importance, from a commercial standpoint, in valves of this type.

It may be noted, further, that immediately prior to complete seating of the valve in its closed position, when the flush tank is completely refilled, the outer edge of the flow deflector will contact the primary sealing gasket 60 at a location outwardly from the seat 29. This occurs before the final snap closing of the gasket 60 against the seat 29. This will re-divide the interior of the hollow, domed valve element 52 into upper and lower chamber portions respectively disposed above and below the flow deflector. These portions of chamber 61 will be of equalized pressure, since the flow deflector will be designed to have a limited but distinct capability of flexure, and is not intended as a perfect seal. This equalization of pressure, immediately prior to the snap closing of the valve, is desirable to facilitate the valve closure action.

During the refilling of the flush tank, as previously noted the signal to open the valve occurs when the weight of the hush tube 42 and valve housing 46 moves the reed actuator pin 66 and partially unseats the pilot seal. As the pilot opening increases water begins to leave through the bowl fill exit tube 50, but does not reach the outer, exit end of the tube, instead gravitating through the leakage port 68. As more water leaves the bowl-fill exit 50 than can flow past the periphery of the flow deflector, the static pressure above the flow deflector, within the valve element, will become small compared to the static pressure within the valve element below the deflector. This causes the valve to unseat fully.

Water flowing from the downwardly facing annulus 70 impinges upon the face of the gasket 60, to hold the gasket 60 away from its seated position, this flow, as previously noted herein, is the full, open flow condition that facilitates the swift, quiet refilling of the entire flush tank. It may therefore be noted that static pressure opens the valve, while the force of the flow past the valve keeps it open. Static pressure supplies the force for the closing action, and static pressure maintains the seal between cycles.

Other features of importance may also be observed, in that the device minimizes the entrapment of particles. Such entrapment, in prior art devices, tends to cause malfunctioning. In the disclosed structure, particles larger than the entrance annulus will remain inside the fill tube, while particles that are smaller will find an ever increasing passageway to the exit. Further, the shape of the passageways and the manner in which the flow is deflected, tends to minimize the possibility of particles wedging in close, confined areas. Still further, the periphery 33 of the flow deflector tends to decrease the size of particles near the fill exit. The comb-like structure 33, at the same time, will be constantly cleaned by the flow. Particles that are in the vicinity of the pilot valve present no problem, in that they exit through the tube 50.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A liquid level control device for a flush tank or the like, comprising:
   (a) an upstanding fill tube structure mountable in said tank in communication with a source of liquid under a predetermined line pressure, said structure having an upper end that includes a valve seat, said structure further including a flow deflector spaced upwardly from the valve seat to define upper and lower pressure chamber portions respectively located above and below the deflector;
   (b) a valve chamber assembly supported on the upper end of the fill tube structure for movement in respect thereto and including a valve chamber and a valve element in the lower pressure chamber portion movable within said chamber out of and into engagement with said seat to valve-opening and closing positions respectively, said chamber communicating with the fill tube structure to normally maintain line pressure within the chamber, the chamber having a bowl-fill exit opening, and a pilot valve means in the upper chamber portion normally closing said opening and extending in a position inclined from the vertical in which it is biased away from said opening responsive to the exertion of pressure exerted against the pilot valve means in a vertical path, said pilot valve means thereby being actuable to permit leakage through the exit opening to a extent effective to reduce pressure in the area of the pilot valve means in the upper chamber portion while maintaining pressure in the area of the valve element in the lower chamber portion, whereby to bias the valve element to its fully open position as a result of the pressure differential produced in said chamber; and
   (c) means for shifting the valve assembly to its respective positions including:
      (1) a float shiftable downwardly and upwardly in a vertical path in respect to both the fill tube structure and the valve assembly responsive to dropping and elevation, respectively, of the liquid level within the tank, and (2) means having a fixed connection to the float so as to shift upwardly and downwardly therewith in said vertical path to bias the valve assembly to its seated position when the float is shifted upwardly, said last named means engaging the pilot valve means when it moves downwardly in the vertical path with the float to actuate the pilot valve means to its open position.

2. A liquid level control device as in claim 1 wherein said last named means is in the form of a housing enclosing the valve assembly.

3. A liquid level control device as in claim 2 wherein the housing includes a bottom wall engageable with the underside of the valve assembly when the float is shifted upwardly to bias the valve element toward the valve seat of the fill tube structure.

4. A liquid level control device as in claim 3 wherein the housing includes a top wall overlying the valve assembly and adapted to engage and actuate the pilot valve means when the float is moved downwardly.

5. A liquid level control device as in claim 4 wherein the valve element and seat define a primary exit for the refill liquid when the valve element is unseated, the valve assembly including an exit tube extending laterally outwardly through said housing to provide a secondary exit for liquid in the full open position of the valve element.

6. A liquid level control device as in claim 5 wherein the valve assembly includes a port communicating with the exit tube and adapted to provide an additional exit for liquid, the port being adapted to constitute a passage for liquid leaked from the valve chamber responsive to actuation of the pilot valve means to its open position.

7. A liquid level control device as in claim 6 further including a hush tube in concentric, spaced relation to the fill tube structure, said hush tube being connected between the float and said housing and communicating with the valve chamber in the unseated position of the valve element primary flow passage for liquid exiting the chamber between the valve element and the seat, and through said port.

8. A liquid level control device as in claim 1 wherein the flow deflector adapted to deflect a major part of the liquid flowing from the fill tube structure laterally outwardly and downwardly in the full open position of the valve element.

9. A liquid level control device as in claim 8 wherein the valve element and the fill tube structure are adapted to define an exit annulus therebetween in the full open position of the valve element.

10. A liquid level control device as in claim 9 further including a hush tube connected between the housing and the float in concentric, spaced relation to the fill tube structure, said hush tube being in communication with the annulus, whereby said hush tube will provide a passage for liquid exiting the fill tube structure through the annulus.

11. A liquid level control device as in claim 1 wherein the fill tube structure extends as a vertical, elongated tube, the valve seat being extended about the upper end thereof and facing downwardly.

12. A liquid level control device as in claim 11 wherein the valve element extends about the upper end portion of said tube, and is adapted to be moved upwardly and downwardly into and out of engagement with said valve seat.

13. A liquid level control device as in claim 1 further including a hush tube extending between and fixedly connected to the housing and to said float in concentric, spaced relation to the fill tube structure, said hush tube being formed open at its lower end and providing a primary passage for liquid exiting the fill tube structure in the full open position of the valve element, said float extending about the hush tube and being spaced downwardly along the length of the hush tube from said housing, the housing having a cavity in which the valve chamber assembly is disposed, said cavity being in communication with the hush tube, the valve chamber assembly including a leakage port through which liquid may drain upon actuation of the pilot valve means, said cavity providing communication between the leakage port and the hush tube for flow of liquid through the leakage port and the cavity and thence into the hush tube.

14. A liquid level control device as in claim 13 wherein the valve chamber assembly further includes an exit tube extending laterally outwardly from the valve chamber in communication with the leakage port, the pilot valve means normally sealing off the exit tube from the valve chamber, said exit tube constituting a secondary passage for liquid exiting the fill tube structure, whereby the exiting liquid will flow out of the housing both through the exit tube and through the hush tube in the open position of the valve element.

15. A liquid level control device as in claim 14 in which the pilot valve means is adapted to be partially unseated to create said pressure differential, whereby to cause the valve element to be moved from closed to full open position, said pilot valve means including a depressible pin extending upwardly from the valve assembly and adapted to be engaged by the housing responsive to lowering of the housing with the hush tube and float on dropping of the liquid level within the tank.

16. A liquid level control device for a flush tank or the like, comprising:
  (a) an upstanding fill tube structure mountable in said tank in communication with a source of liquid under a predetermined line pressure, said structure having an upper end that includes a valve seat;
  (b) a valve chamber assembly supported on the upper end of the fill tube structure for movement in respect thereto and including a valve chamber and a valve element movable within said chamber out of and into engagement with said seat to valve-opening and closing positions respectively, said chamber communicating with the fill tube structure to normally maintain line pressure within the chamber, the chamber having a bowl-fill exit opening, and a pilot valve means normally closing said opening and actuable to permit leakage therethrough to an extent effective to reduce pressure in the area of the pilot valve means while maintaining pressure in the area of the valve element, whereby to bias the valve element to its fully open position as a result of the pressure differential produced in said chamber; and
  (c) means for shifting the valve assembly to its respective positions including:
    (1) a float shiftable downwardly and upwardly in respect to both the fill tube structure and the valve assembly responsive to dropping and elevation, respectively, of the liquid level within the tank, and
    (2) means movable with the float to bias the valve assembly to its seated position when the float is shifted upwardly, said last named means engaging the pilot valve means when the float moves downwardly to actuate the same, the fill tube structure including a flow deflector overlying and spaced upwardly from the valve seat to define upper and lower pressure chamber portions respectively disposed above and below the deflector, the upper chamber portion defining said area of the pilot valve means and the lower chamber portion defining said area of the valve element, and the deflector being adapted to deflect a major part of the liquid flowing from the fill tube structure laterally outwardly and downwardly in the full open position of the valve element, the valve element and the fill tube structure being adapted to define an exit annulus therebetween in the full open position of the valve element, said device further including a hush tube connected between the housing and the float in concentric, spaced relation to the fill tube structure, said hush tube being in communication with the annulus, whereby said hush tube will provide a passage for liquid exiting the fill tube structure through the annulus, the float and the hush tube being connected for joint movement, the hush tube being rigidly connected, at its upper end, to the housing for conjoint movement of the housing, hush tube, and float.

17. A liquid level control device as in claim 16 wherein said valve seat faces downwardly, the valve element underlying the valve seat and extending as an annular member adapted to engage the valve seat upon upward biasing of the valve element upon elimination of said pressure differential responsive to closure of the pilot valve means.

* * * * *

UNITED STATES PATENT AND TRADEMARK OFFICE
CERTIFICATE OF CORRECTION

PATENT NO. : 4,431,024
DATED : Feb. 14, 1984
INVENTOR(S) : Patrick Gallagher

It is certified that error appears in the above-identified patent and that said Letters Patent is hereby corrected as shown below:

Column 3, line 46, "comb-like" should read -- comb-like" --

Column 5, line 58, before "filling" should read -- initial --

Column 8, line 55, "a" should read -- an --.

Signed and Sealed this

Twenty-ninth Day of May 1984

[SEAL]

Attest:

GERALD J. MOSSINGHOFF

Attesting Officer

Commissioner of Patents and Trademarks